(12) United States Patent
Yang

(10) Patent No.: US 12,370,842 B2
(45) Date of Patent: Jul. 29, 2025

(54) TIRE PRESSURE SENSOR INFORMATION PROCESSING METHOD AND APPARATUS, AND DEVICE

(71) Applicant: Autel Intelligent Technology Corp., Ltd., Shenzhen (CN)

(72) Inventor: Jian Yang, Shenzhen (CN)

(73) Assignee: Autel Intelligent Technology Corp., Ltd., Shenzhen (CN)

( * ) Notice: Subject to any disclaimer, the term of this patent is extended or adjusted under 35 U.S.C. 154(b) by 137 days.

(21) Appl. No.: 18/280,477

(22) PCT Filed: Mar. 1, 2022

(86) PCT No.: PCT/CN2022/078686
§ 371 (c)(1),
(2) Date: Sep. 6, 2023

(87) PCT Pub. No.: WO2022/188664
PCT Pub. Date: Sep. 15, 2022

(65) Prior Publication Data
US 2024/0140146 A1 May 2, 2024

(30) Foreign Application Priority Data
Mar. 9, 2021 (CN) .......................... 202110254383.5

(51) Int. Cl.
*B60C 23/04* (2006.01)
(52) U.S. Cl.
CPC ...... *B60C 23/0416* (2013.01); *B60C 23/0471* (2013.01)
(58) Field of Classification Search
CPC ............ B60C 23/0416; B60C 23/0471; B60C 23/0479; B60C 23/0472; B60C 23/04; G01L 17/00
See application file for complete search history.

(56) References Cited

U.S. PATENT DOCUMENTS

| 2007/0090936 A1 | 4/2007 | Nornes |
| 2008/0143506 A1 | 6/2008 | Kochie |

(Continued)

FOREIGN PATENT DOCUMENTS

| CN | 201436216 U | 4/2010 |
| CN | 202080077 U | 12/2011 |

(Continued)

OTHER PUBLICATIONS

The extended European Search Report of EP Patent Application No. 22766190.7 issued on Jul. 25, 2024.

(Continued)

*Primary Examiner* — Omeed Alizada
(74) *Attorney, Agent, or Firm* — Andrew C. Cheng

(57) ABSTRACT

A tire pressure sensor information processing method includes: step 210, determining a tire position to be reset, the tire position to be reset being a tire position having corresponding tire pressure sensor identity information in a tire pressure monitoring system that needs to be cleared; step 220, generating false identity information for a tire pressure sensor of the tire position to be reset; step 230, after the tire pressure monitoring system enables a learning mode, sending the false identity information to the tire pressure monitoring system, so as to cause the tire pressure monitoring system to update identity information of the tire pressure sensor of the tire position to be reset to the false identity information; step 240, obtaining real identity information of a tire pressure sensor of a tire position to be matched; and step 250, sending the real identity information to the tire pressure monitoring system, so as to cause the tire pressure monitoring system to update identity information of the tire pressure sensor of the tire position to be matched to the real identity information.

20 Claims, 4 Drawing Sheets

(56) References Cited

U.S. PATENT DOCUMENTS

| | | | |
|---|---|---|---|
| 2008/0164988 A1* | 7/2008 | DeKeuster | B60C 23/0408 340/442 |
| 2012/0001745 A1 | 1/2012 | Li | |
| 2013/0106596 A1 | 5/2013 | Mouchet | |
| 2015/0015387 A1* | 1/2015 | McIntyre | B60C 23/0471 340/447 |

FOREIGN PATENT DOCUMENTS

| | | |
|---|---|---|
| CN | 102555698 A | 7/2012 |
| CN | 104129241 A | 11/2014 |
| CN | 104175819 A | 12/2014 |
| CN | 104354545 A | 2/2015 |
| CN | 105730155 A | 7/2016 |
| CN | 106240252 A | 12/2016 |
| CN | 106585297 A | 4/2017 |
| CN | 109532354 A | 3/2019 |
| CN | 109703302 A | 5/2019 |
| CN | 111225029 A | 6/2020 |
| CN | 112959860 A | 6/2021 |
| EP | 3300930 A1 | 4/2018 |
| JP | 2005349958 A | 12/2005 |
| JP | 2012201332 A | 10/2012 |
| KR | 20180069332 A | 6/2018 |
| TW | 201540568 A | 11/2015 |
| WO | 2010003151 A2 | 1/2010 |
| WO | 2015009599 A1 | 1/2015 |

OTHER PUBLICATIONS

International Search Report of PCT Patent Application No. PCT/CN2022/078686 issued on Jun. 6, 2022.

Search report of CN application No. 2021102543835 issued on May 31, 2022.

* cited by examiner

TIRE PRESSURE SENSOR INFORMATION PROCESSING METHOD AND APPARATUS, AND DEVICE

CROSS-REFERENCE TO RELATED APPLICATIONS

The present application is the National Stage application for PCT patent application Serial No. PCT/CN2022/078686, filed on Mar. 1, 2022, which claims priority to the Chinese patent application No. 202110254383.5 entitled "tire pressure sensor information processing method and apparatus, and device" filed on Mar. 9, 2021, to the China National Intellectual Property Administration, the entire contents of which are incorporated herein by reference

TECHNICAL FIELD

The present application relates to the technical field of tire pressure monitoring, specifically to a tire pressure sensor information processing method and apparatus, and a device.

BACKGROUND OF THE INVENTION

A tire pressure monitoring system (TPMS) is a technology that uses wireless sensor apparatus installed in a tire to collect the vehicle tire pressure data and transmit the data to the vehicle host to monitor the tire pressure in real-time under vehicle running or stationary states. The tire pressure monitoring system needs to perform matching learning before accurately monitoring the state of a tire, i.e. different wireless sensors are bound with corresponding tire positions, so that the system knows the data of which tire the signal sent from a certain sensor is.

In carrying out the embodiments of the present invention, the inventors have found that: in the existing tire pressure sensor matching process, if the information of the tire pressure sensor to be matched is repeated with the information of the tire pressure sensor already stored in the tire pressure monitoring system, a matching learning failure will be resulted in.

SUMMARY OF THE INVENTION

In view of the above issues, the embodiments of the present invention provide a tire pressure sensor information processing method and apparatus, and a device for solving the problem in the prior art of tire pressure sensor matching failure caused by information repetition.

According to one aspect of an embodiment of the present invention, there is provided a tire pressure sensor information processing method. The method comprises:

determining tire position to be reset, tire position to be reset being tire position having corresponding tire pressure sensor identity information in tire pressure monitoring system that needs to be cleared;

generating false identity information for a tire pressure sensor of tire position to be reset;

after the tire pressure monitoring system enables learning mode, sending false identity information to the tire pressure monitoring system, so as to cause the tire pressure monitoring system to update the identity information of the tire pressure sensor of tire position to be reset to false identity information;

obtaining real identity information of tire pressure sensor of tire position to be matched, tire position to be matched comprising tire position to be reset; and sending real identity information to the tire pressure monitoring system, so as to cause the tire pressure monitoring system to update the identity information of the tire pressure sensor of tire position to be matched to real identity information.

In an alternative mode, before determining the tire position to be reset, the following is included:

sending tire pressure sensor identity information for a first tire position to the tire pressure monitoring system; and receiving a prompt message sent by the tire pressure monitoring system that repeated identity information exists.

In an alternative mode, the prompt message includes prompt information that the tire pressure sensor identity information for the first tire position repeats with the tire pressure sensor identity information for the second tire position that has been recorded in the tire pressure monitoring system.

Determining a tire position to be reset includes: determining the second tire position as the tire position to be reset according to the prompt information.

In an alternative mode, determining the tire position to be reset includes:

according to the prompt message, obtaining, from the tire pressure monitoring system, information that the tire pressure sensor identity information about the first tire position and the tire pressure sensor identity information about a second tire position that has been recorded in the tire pressure monitoring system repeat; and determining the second tire position as the tire position to be reset.

In an alternative mode, determining the tire position to be reset includes:

obtaining all tire positions recorded with tire pressure sensor identity information from the tire pressure monitoring system; and determining the tire positions as the tire positions to be reset.

In an alternative mode, determining the tire position to be reset includes:

obtaining all tire positions monitored by the tire pressure monitoring system according to vehicle models; and determining the tire positions as the tire positions to be reset.

In an alternative mode, generating false identity information for the tire pressure sensor of tire position to be reset includes:

determining a format of the tire pressure sensor identity information; and generating the false identity information for the tire pressure sensor of the tire position to be reset according to the format of the tire pressure sensor identity information.

In an alternative mode, generating the false identity information for the tire pressure sensor of the tire position to be reset according to the format of the tire pressure sensor identity information includes:

generating random identity information for the tire pressure sensor of the tire position to be reset by using a random algorithm according to the format of the tire pressure sensor identity information.

In an alternative mode, generating the false identity information for the tire pressure sensor of the tire position to be reset according to the format of the tire pressure sensor identity information includes:

generating null identity information for the tire pressure sensor of the tire position to be reset according to the format of the tire pressure sensor identity information, wherein the null identity information is special identity information that can be recognized by the tire pressure monitoring system.

According to another aspect of an embodiment of the present invention, there is provided a tire pressure sensor information processing apparatus. The apparatus comprises:

a determination module configured to determine the tire position to be reset, the tire position to be reset being the tire position having corresponding tire pressure sensor identity information in a tire pressure monitoring system that needs to be cleared;

a generation module configured to generate false identity information for the tire pressure sensor of the tire position to be reset;

a first sending module configured to, after the tire pressure monitoring system enables learning mode, send the false identity information to the tire pressure monitoring system, so as to cause the tire pressure monitoring system to update identity information of the tire pressure sensor of the tire position to be reset to the false identity information;

an obtaining module configured to obtain real identity information of tire pressure sensor of tire position to be matched, the tire position to be matched comprising the tire position to be reset; and a second sending module configured to send the real identity information to the tire pressure monitoring system, so as to cause the tire pressure monitoring system to update identity information of the tire pressure sensor of the tire position to be matched to the real identity information.

According to another aspect of the embodiments of the present invention, there is provided a tire pressure sensor information processing device, comprising: a processor, a memory, a communication interface, and a communication bus, wherein the processor, the memory, and the communication interface complete mutual communication through the communication bus;

the memory is configured to store at least one executable instruction that causes the processor to execute an operation of the tire pressure sensor information processing method.

According to the embodiments of the present invention, a tire pressure sensor information processing method determines a tire position to be reset, generates false identity information for a tire pressure sensor at the tire position to be reset, updates the identity information of the tire pressure sensor at the tire position to be reset in a tire pressure monitoring system as the false identity information, obtains the real identity information about the tire pressure sensor corresponding to a tire position to be matched including the tire position to be reset, and sends the same to the tire pressure monitoring system, so that the tire pressure monitoring system updates the identity information about the tire pressure sensor at the tire position to be matched as the real identity information. The above method can effectively avoid the repetition of the real identity information about the tire pressure sensor written in the matching learning process and the original identity information already stored in the tire pressure monitoring system by determining the tire position to be reset where the tire pressure sensor identity information clearing operation needs to be performed, updating the original identity information about the tire pressure sensor at the tire position to false identity information in the tire pressure monitoring system, and then writing the real identity information about the tire pressure sensor at the tire position to be matched into the tire pressure monitoring system, thus greatly improving the success rate of the tire pressure sensor matching and improving user experience.

The above description is only an overview of the technical schemes of the embodiments of the invention. In order to understand the technical means of the embodiments of the invention more clearly, it can be implemented according to the contents of the description. In order to make the above and other purposes, features, and advantages of the embodiments of the invention more obvious and understandable, specific implementation modes of the invention are listed below.

BRIEF DESCRIPTION OF DRAWINGS

The drawings are only for the purposes of illustrating the implementation modes and are not to be construed as limiting the present invention. Moreover, like reference numerals denote like components throughout the drawings. In the drawings.

DETAILED DESCRIPTION OF THE INVENTION

Hereinafter, exemplary embodiments of the present invention will be described in more detail with reference to the accompanying drawings. While the drawings show exemplary embodiments of the invention, it should be understood that the invention may be implemented in various forms and should not be limited by the embodiments described herein.

Figure 1:
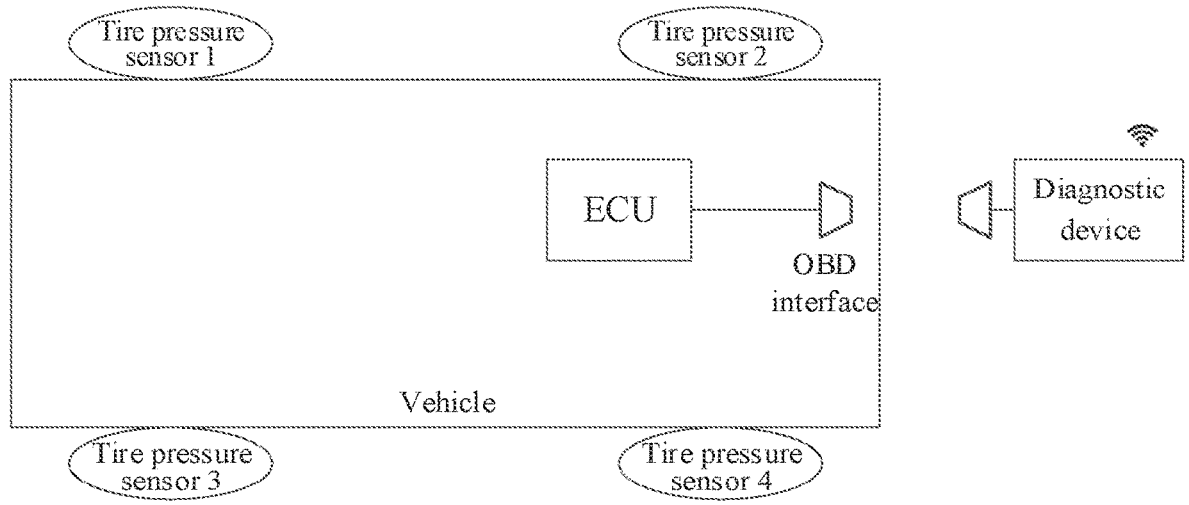
FIG. 1 shows a schematic diagram of device connection in a tire pressure sensor matching learning scene provided by an embodiment of the present invention.

The embodiments of the present invention are mainly applied to the scene where a tire pressure monitoring system of a vehicle performs matching learning on a tire pressure sensor installed in a wheel. FIG. 1 shows a schematic diagram of device connection in a tire pressure sensor matching learning scene provided by an embodiment of the present invention. As shown in FIG. 1, a tire pressure monitoring system of a vehicle includes an electronic control unit (ECU) and a tire pressure sensor installed on a wheel. Generally, one tire pressure sensor (such as tire pressure sensors 1 to 4 in FIG. 1) is installed in each of the tires of four wheels of a vehicle, the tire pressure monitoring system can monitor the tire pressure at four tire positions, tire pressure sensors are also installed in spare tires of some vehicle models, and the state of the spare tires can also be monitored at this time.

In the case where the tire pressure monitoring system is initialized, or the tire pressure sensor is replaced, or the tire position is exchanged, etc., binding learning between the tire position and the tire pressure sensor is required. A diagnostic device may be used for communication with the ECU of the tire pressure monitoring system to complete matching learning of the tire pressure sensor. Specifically, the matching learning of the tire pressure sensor can be divided into a high-frequency learning mode and an OBD (On-Board Diagnostics) learning mode.

The high-frequency learning mode refers to a mode in which the diagnostic device sequentially sends high-frequency signal data carrying the identity information about each tire pressure sensor to the ECU for identifying and matching in a certain order during the tire pressure sensor matching learning process. The data can be sent by the diagnostic device triggering the tire pressure sensor or triggering an auxiliary sensor storing the tire pressure sensor identity information, or directly sent by the diagnostic device storing the tire pressure sensor identity information. The OBD learning mode refers to the way to realize the tire pressure sensor matching learning by the diagnostic device sending a special command carrying the tire pressure sensor identity information to the ECU during the tire pressure sensor matching learning process.

The diagnostic device may connect and communicate with the ECU in a wired manner such as an OBD (On-Board Diagnostics) interface connection, or a wireless manner, such as high-frequency signals, Bluetooth, or Wi-Fi, etc. The diagnostic device may connect and communicate wirelessly with a tire pressure sensor, such as a low-frequency signal, a high-frequency signal, Bluetooth, etc. Preferably, the diagnostic device is a dedicated matching tool device, or may be a PC, cell phone, tablet computer, or the like which has at least one of the above-mentioned communication modes and can connect and communicate with various devices Preferably, the low-frequency signal comprises a 60-200 KHz radio frequency signal and the high-frequency signal comprises a 300-900 MHz radio frequency signal.

Figure 2:
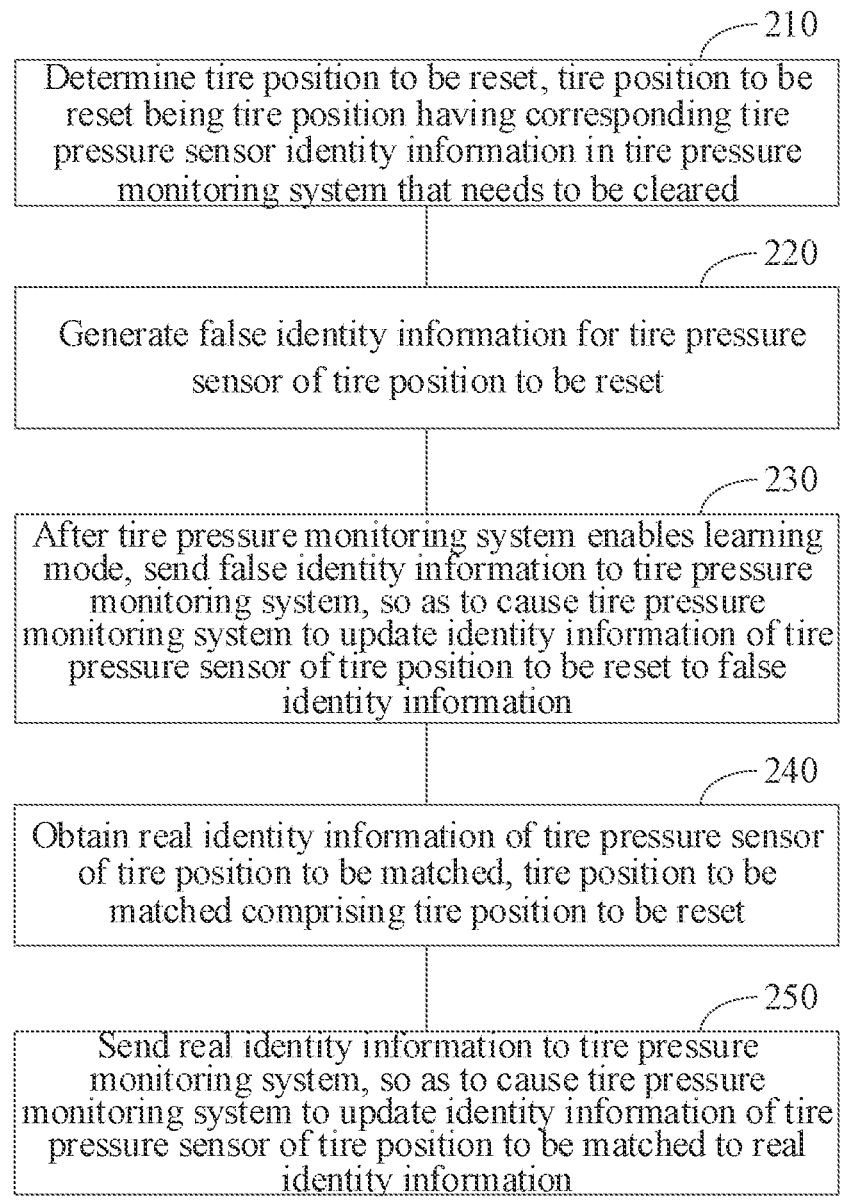
FIG. 2 shows a schematic flow diagram of a tire pressure sensor information processing method provided by an embodiment of the present invention.

FIG. 2 shows a schematic flow diagram of a tire pressure sensor information processing method provided by an embodiment of the present invention. The method may be specifically executed by the diagnostic device as described above. As shown in FIG. 2, the method comprises steps as follows.

Step 210, determine the tire position to be reset, tire position to be reset being the tire position having corresponding tire pressure sensor identity information in the tire pressure monitoring system that needs to be cleared.

The tire pressure sensor identity information includes an identification (ID) of the tire pressure sensor or other information that can be used to uniquely identify one tire pressure sensor. Specifically, the tire pressure sensor IDs for one or more tire positions may have already been stored in the tire pressure monitoring system. In order to avoid the repetition of IDs during the matching process, the tire position to be reset needs to be determined to clear the original tire pressure sensor ID corresponding to the tire position recorded in the tire pressure monitoring system.

Optionally, prior to step 210, a process of discovering tire pressure sensor identity information is repeated is included, as follows.

Step 211: send tire pressure sensor identity information for a first tire position to the tire pressure monitoring system.

Specifically, during one matching learning of the tire pressure sensor, the diagnostic device sends the tire pressure sensor ID of the first tire position to the ECU of the tire pressure monitoring system directly by itself or via the tire pressure sensor or an auxiliary sensor. The first tire position is a tire position to be matched required to match the tire pressure sensor ID in the tire pressure monitoring system. For example, when the tires of the left front position and the right front position are exchanged during vehicle maintenance, the tire pressure sensor needs to be learned again, and the diagnostic device may send a new tire pressure sensor ID of the left front position (first tire position) to the ECU.

Step 212: receive a prompt message sent by the tire pressure monitoring system that repeated identity information exists.

Specifically, after receiving the tire pressure sensor ID of the first tire position, ECU compares the ID with the recorded tire pressure sensor ID, and finds that a certain stored tire pressure sensor ID is the same as the tire pressure sensor ID of the first tire position, Therefore, an identity information repetition occurs. A prompt message of the presence of a repeated ID is sent out via a display interface or sent to a diagnostic device. The diagnostic device receives the prompt message sent by the ECU. Preferably, the prompt message is a negative acknowledgment command containing ID repetition. For example, after the ECU receives a new tire pressure sensor ID in the left front position and finds that the ID is repeated with the stored tire pressure sensor ID in the right front position (the second tire position), it sends a prompt message that a repeated ID exists.

Preferably, depending on different determination methods, step 210 may specifically include the following specific implementation modes.

Mode one, according to the prompt message, determine the tire position, in the tire pressure monitoring system, where repeated identity information exists as the tire position to be reset.

The prompt message includes prompt information that the tire pressure sensor identity information for the first tire position repeats with the tire pressure sensor identity information for the second tire position that has been recorded in the tire pressure monitoring system; then step 210 specifically comprises:

step 213: determining the second tire position as the tire position to be reset according to the prompt information.

Specifically, the diagnostic device identifies the prompt message, determines that the tire pressure sensor identity information of the second tire position repeats with the tire pressure sensor identity information of the first tire position to be matched which shows a need to perform a clearing operation, and determines the second tire position as the tire position to be reset. For example, the prompt message sent by the ECU that a repeated ID exists includes information that the tire pressure sensor ID of the left front position to be matched and the stored tire pressure sensor ID of the right front position repeat, and the diagnostic device identifies the prompt message and determines the right front position as the tire position to be reset.

Mode two, obtain the tire position where the repeated identity information exists from the tire pressure monitoring system and determine the same as the tire position to be reset.

Specifically, step 210 may include:

step 214: according to the prompt message, obtaining, from a tire pressure monitoring system, information that the tire pressure sensor identity information about the first tire position and tire pressure sensor identity information about the second tire position that has been recorded in the tire pressure monitoring system repeat; and determining the second tire position as the tire position to be reset.

After receiving the prompt message sent by the ECU that a repeated ID exists, the diagnostic device obtains information from the tire pressure monitoring system that the tire position which is repeated with the tire pressure sensor ID of the first tire position to be matched is the second tire position, and then determines the second tire position as the tire position to be reset. For example, after receiving a prompt message that a repeated ID exists, the diagnostic device obtains information from the ECU that the tire pressure sensor ID of the left front position to be matched is repeated with the stored tire pressure sensor ID of the right front position, and determines the right front position as the tire position to be reset.

Mode three, determine the tire position where the tire pressure sensor ID is recorded in the tire pressure monitoring system as the tire position to be reset.

Specifically, step 210 may include:
step 215: obtaining all tire positions recorded with tire pressure sensor identity information from the tire pressure monitoring system; and determining the tire position as a tire position to be reset.

The diagnostic device may obtain from the ECU all tire positions in which the tire pressure sensor ID has been stored, and determine the tire position as the tire position to be reset. For example, if the diagnostic device obtains from the ECU that the tire pressure sensor ID is stored in the right front position and the left rear position, the right front position and the left rear position are determined as the tire positions to be reset.

Mode four, determine all the tire positions monitored by the tire pressure monitoring system as the tire positions to be reset.

Specifically, step 210 may include:
step 216: obtaining all tire positions monitored by the tire pressure monitoring system according to vehicle models; and determining the tire positions as the tire position to be reset.

The diagnostic device may determine all tire positions monitored by the tire pressure monitoring system as tire positions to be reset. As described above, the tire positions monitored by the tire pressure monitoring system are different for different vehicle models. Generally, the monitored tire positions are left front, right front, left rear, and right rear four wheels. Some vehicle models also monitor the spare tire and even the second spare tire. Therefore, there are still 5 or 6 wheels in the monitored tire positions. There is no limit on the specific number of wheels monitored for different vehicles. The diagnostic device obtains all the tire positions monitored by the tire pressure monitoring system of the vehicle, for example, the left front wheel, the right front wheel, the left rear wheel, and the right rear wheel, in a preset database according to the vehicle model, and determines the four tire positions as the tire positions to be reset.

It needs to be noted that mode three and mode four may be executed after the tire pressure sensor identity information is found to be repeated, or may be executed directly without determining whether the tire pressure sensor identity information is repeated. That is, mode three and mode four may be executed after step 211 and step 212, or may be executed directly. In a specific application, a user can judge that ID repetition is likely to occur when performing tire pressure sensor matching learning according to situations (for example, after exchanging two wheels). Then mode three or mode four can be directly used to determine the tire position to be reset and a clearing operation is performed, which can ensure the success rate of matching and further improve the efficiency of tire pressure sensor matching. In addition, the number of tire positions to be reset may be flexibly determined according to specific circumstances, which will not be limited in the embodiments of the present invention.

Step 220, generate the false identity information for the tire pressure sensor of the tire position to be reset.

In order to clear the original tire pressure sensor ID of the tire position to be reset, a method of generating a temporary false ID and updating the tire pressure sensor information of the tire position to be reset to the false ID in the tire pressure monitoring system may be employed. Specifically, step 220 may include:
step 221: determining the format of the tire pressure sensor identity information.

Specifically, the diagnostic device can obtain the format of the tire pressure sensor ID adopted by the tire pressure monitoring system of the vehicle from a preset database according to the vehicle model; or can also obtain the format of the stored tire pressure sensor ID from the tire pressure monitoring system. The format of the tire pressure sensor identity information includes the number of bytes of the tire pressure sensor ID, etc.

Step 222, generate the false identity information for the tire pressure sensor of the tire position to be reset according to the format of the tire pressure sensor identity information.

Preferably, the method of randomly generating false identity information may be used. Step 222 may include:
step 2221: generating random identity information for the tire pressure sensor of the tire position to be reset by using a random algorithm according to the format of the tire pressure sensor identity information.

After determining the format of the tire pressure sensor ID, the diagnostic device uses a random algorithm to generate a random ID for the tire position to be reset. For example, when the tire positions to be reset have four tire positions, i.e. left front, right front, left rear, and right rear, four random IDs are generated using the random algorithm.

Although the random algorithm is used to generate the false ID of the tire pressure sensor, there is still a certain probability that the false ID conflicts with the real ID to cause a subsequent matching learning failure. In order to avoid this occurrence, further, step 2221 may comprise:
step 22211: obtaining the recorded tire pressure sensor identity information from the tire pressure monitoring system; and
step 22212: randomly changing a preset byte bit in the recorded tire pressure sensor identity information according to the format of the tire pressure sensor identity information, and generating random identity information for the tire pressure sensor of the tire position to be reset.

Specifically, the diagnostic device may obtain the recorded ID of each tire pressure sensor from the above tire pressure monitoring system, and randomly change one or more bytes to generate a random ID to be different from the original ID. For example, the recorded original tire pressure sensor ID of the right front position to be reset is 1511 with four bits, and the preset byte bits that need to be changed are the third bit and the fourth bit from left to right; the diagnostic device randomly changes the third bit to 2 which is different from the original value and the fourth bit to 3 which is different from the original value by using the random algorithm, resulting in a random ID of 1523. The random ID is obtained in the same way for other tire positions to be reset.

Optionally, in addition to the above-mentioned method for randomly changing a preset byte bit in the original tire pressure sensor identity information, a method for comparison and repeated removal may also be used to avoid the repetition of the random identity information and the real identity information. Step 222 may further include:

step 2222: obtaining the recorded tire pressure sensor identity information from the tire pressure monitoring system; and step 2223: comparing the random identity information with the recorded tire pressure sensor identity information, and if the random identity information and the recorded tire pressure sensor identity information repeat, regenerating the random identity information by using a random algorithm.

Specifically, the diagnostic device compares the random ID with the tire pressure sensor ID stored in the ECU, for example, compares the four random IDs with the original IDs of the four tire positions, and if it is found that the random ID of the right rear position is repeated with the original ID, regenerates the random ID for the right rear position.

It needs to be noted that, since the diagnostic device may not have obtained the real identity information of the tire pressure sensor of the tire position to be matched when executing step 220, the comparison is made with the original tire pressure sensor ID stored in the ECU during the comparison and removal in that the generated random ID only needs to be distinguished from the original tire pressure sensor ID so as to avoid repeating with the real ID to be matched with a high probability if the original ID and the real ID are repeated. Of course, if the diagnostic device has obtained the real identity information for the tire pressure sensor at the tire position to be matched, the random ID may be compared with the real ID to better avoid the occurrence of a repeating condition, where step 222 may include:

step 2224: comparing the random identity information with the real identity information about a tire pressure sensor of a tire position to be matched, and if the random identity information repeats with the real identity information, using a random algorithm to regenerate the random identity information.

In addition to the above-mentioned way of random identity information, a way of using null identity information to generate false identity information can also be used. Then step 222 can include:

step 2225: generating null identity information for the tire pressure sensor of the tire position to be reset according to the format of the tire pressure sensor identity information, wherein the null identity information is special identity information that can be recognized by the tire pressure monitoring system.

Specifically, the above-mentioned null identity information comprises an ID with zero in each byte bit, an ID with F in each byte bit, or other default special IDs that can be recognized by an ECU. These empty IDs are generally not used as real IDs for tire pressure sensors, but only in special cases as IDs with a specific meaning for ECU recognition and usage.

Step 230, after the tire pressure monitoring system enables learning mode, send false identity information to the tire pressure monitoring system, so as to cause the tire pressure monitoring system to update the identity information of the tire pressure sensor of tire position to be reset to false identity information.

Specifically, the diagnostic device can send an OBD diagnostic command (OBD learning mode) to the ECU through wired or wireless methods such as Bluetooth, Wi-Fi, etc., or start the learning mode of the tire pressure monitoring system by sending high-frequency signals (high-frequency learning mode) to the ECU; or can also start the learning mode by manually operating the vehicle's tire pressure monitoring system by the user.

In the learning mode of the tire pressure monitoring system, the diagnostic device sequentially sends the tire pressure sensor false ID of the tire position to be reset to the ECU according to the matching sequence and requirements of the ECU, for example, sequentially sending random IDs of the left front, right front, left rear, and right rear tire positions to the ECU. After the ECU receives the same, the ECU updates the identity information of the tire pressure sensor of the tire position to be reset to the false ID. If the tire position to be reset has only the right front position, the diagnostic device only needs to send the false ID to the ECU when the right front position is matched, and the tire pressure sensor IDs of the other tire positions are unchanged.

When the diagnostic device sends the above false ID to the ECU, high-frequency signals can be used to transmit data, or the data can be transmitted by using OBD wired connection or wireless methods such as Bluetooth, Wi-Fi, etc. through a diagnostic command.

Step 240, obtain real identity information of tire pressure sensor of tire position to be matched, tire position to be matched comprising tire position to be reset.

Specifically, the diagnostic device can obtain the real identity information of the tire pressure sensor by the following modes:

1, activation. The diagnostic device can send a low frequency or Bluetooth activation signal to the tire pressure sensor of the tire position to be matched, the tire pressure sensor sends its ID to the diagnostic device after receiving the activation signal, and the diagnostic device receives and stores the ID of the tire pressure sensor.

2, manual input mode, which may specifically include: keyboard input, touch screen input, voice input, or code scanning input, etc. After the user manually inputs the ID of the tire pressure sensor at the tire position to be matched, the diagnostic device saves the same.

3, diagnostic reading mode. The diagnostic device reads the ID of the tire pressure sensor that the tire pressure monitoring system has matched and bound through the OBD system. This mode mainly aims at the situation where the original tire pressure sensor ID does not need to be replaced and the tire pressure sensor sequence does not change. For example, if the measured tire pressure data of a certain tire pressure sensor is inaccurate, it needs to be reset.

It needs to be noted that step 240 may be executed anywhere after step 210 and before step 250. If, prior to step 240, the diagnostic device has obtained the real identity information about a part of the tire pressure sensors to be matched, for example, in the case of the above-mentioned tire exchanging of the left front position and the right front position, the diagnostic device has obtained the real ID of the tire pressure sensor of the left front position to be matched when determining the tire position to be reset, and step 240 may only include obtaining the real identity information about the tire position to be reset, namely, the real ID of the tire pressure sensor of the right front position. In addition, in the case where all the tire positions monitored by the tire pressure monitoring system are determined as the tire positions to be reset as described above, the real identity information of all the tire positions must be obtained for subsequent writing into the ECU, so that the real identity information of all the tire positions is obtained in step 240. Step 240 may be executed at any position before step 250 of the present embodiment.

Step 250, send real identity information to the tire pressure monitoring system, so as to cause the tire pressure monitoring system to update the identity information of the tire pressure sensor of tire position to be matched to real identity information.

Alternatively, in the high-frequency learning mode, the learning mode of the tire pressure monitoring system needs to be turned on again before step 250. The learning mode can be turned on by sending high-frequency signals to the ECU, or by manually operating the vehicle's tire pressure monitoring system by the user.

Similar to step 230, the diagnostic device sequentially sends the real ID of the tire pressure sensors of the tire positions to be matched to the ECU according to the matching sequence and requirements of the ECU, for example, sequentially sending the real IDs of the left front, right front, left rear, and right rear tire positions to the ECU. After the ECU receives the same, the ECU updates the identity information of the tire pressure sensor of the tire position to be matched to the real ID. Since the tire pressure sensor false ID of the tire position to be reset is previously stored in the ECU, the occurrence of the repetition problem when writing the real ID can be effectively avoided in step 250, improving the success rate of tire pressure sensor matching learning.

When the diagnostic device sends the above real ID to the ECU, high-frequency signals can be used to transmit data, or the data can be transmitted by using OBD wired connection or wireless methods such as Bluetooth, Wi-Fi, etc. through a diagnostic command.

Subsequently, the diagnostic device determines that the tire pressure sensor matching learning of the tire position to be matched succeeds according to a prompt of the tire pressure monitoring system, such as an affirmative response to the diagnostic command.

In summary, the tire pressure sensor information processing method provided by the embodiments of the present invention can effectively avoid the repetition of the real identity information about the tire pressure sensor written in the matching learning process and the original identity information already stored in the tire pressure monitoring system by determining the tire position to be reset where the tire pressure sensor identity information clearing operation needs to be performed, updating the original identity information about the tire pressure sensor at the tire position to false identity information in the tire pressure monitoring system, and then writing the real identity information about the tire pressure sensor at the tire position to be matched into the tire pressure monitoring system, thus greatly improving the success rate of the tire pressure sensor matching and improving user experience.

Figure 3:
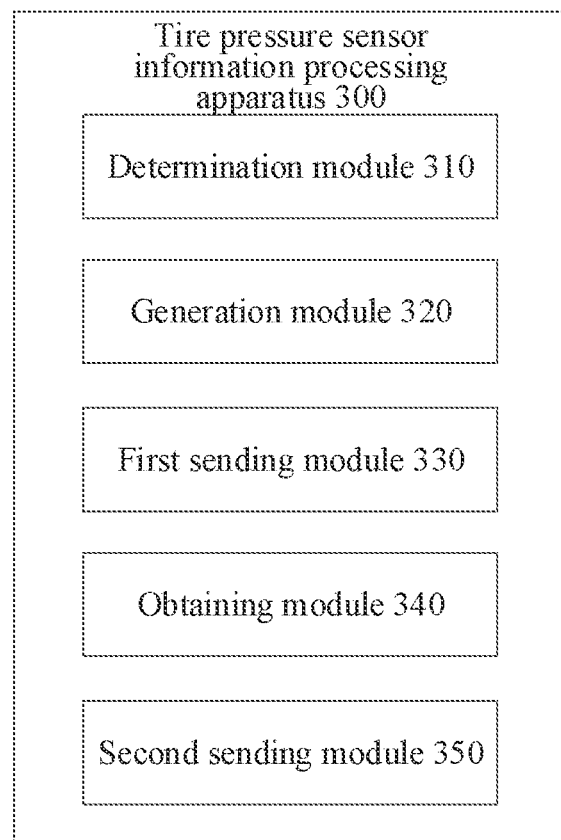
FIG. 3 shows a schematic structural diagram of a tire pressure sensor information processing apparatus provided by an embodiment of the present invention.

FIG. 3 shows a schematic structural diagram of a tire pressure sensor information processing apparatus provided by an embodiment of the present invention. The apparatus may in particular be a diagnostic device as in the embodiments described above. As shown in FIG. 3, the apparatus 300 includes:

- a determination module 310 configured to determine tire position to be reset, tire position to be reset being tire position having corresponding tire pressure sensor identity information in tire pressure monitoring system that needs to be cleared;
- a generation module 320 configured to generate false identity information for the tire pressure sensor of tire position to be reset;
- a first sending module 330 configured to, after the tire pressure monitoring system enables learning mode, send false identity information to the tire pressure monitoring system, so as to cause the tire pressure monitoring system to update identity information of tire pressure sensor of tire position to be reset to false identity information;
- an obtaining module 340 configured to obtain real identity information of tire pressure sensor of tire position to be matched, tire position to be matched comprising tire position to be reset; and
- a second sending module 350 configured to send real identity information to the tire pressure monitoring system, so as to cause the tire pressure monitoring system to update the identity information of the tire pressure sensor of tire position to be matched to real identity information.

In an alternative mode, the apparatus further includes:
- a third sending module 360 configured to send tire pressure sensor identity information for a first tire position to the tire pressure monitoring system; and
- a receiving module 370 configured to receive a prompt message sent by the tire pressure monitoring system that repeated identity information exists.

In an alternative mode, the prompt message includes prompt information that the tire pressure sensor identity information for the first tire position repeats with the tire pressure sensor identity information for the second tire position that has been recorded in the tire pressure monitoring system. The determination module 310 includes:
- a first determination unit 311 configured to determine the second tire position as the tire position to be reset according to the prompt information.

In an alternative mode, the determination module 310 includes:
- a second determination unit 312 configured to, according to the prompt message, obtain, from a tire pressure monitoring system, information that the tire pressure sensor identity information about the first tire position and tire pressure sensor identity information about the second tire position that has been recorded in the tire pressure monitoring system repeat; and determine the second tire position as the tire position to be reset.

In an alternative mode, the determination module 310 includes:
- a third determination unit 313 configured to obtain all tire positions recorded with tire pressure sensor identity information from the tire pressure monitoring system; and determine the tire position as a tire position to be reset.

In an alternative mode, the determination module 310 includes:
- a fourth determination unit 314 configured to obtain all tire positions monitored by the tire pressure monitoring system according to vehicle models; and
- determine the tire positions as the tire position to be reset.

In an alternative mode, the generation module 320 includes:
- a format determination unit 321 configured to determine the format of the tire pressure sensor identity information; and
- a generation unit 322 configured to generate the false identity information for the tire pressure sensor of the tire position to be reset according to the format of the tire pressure sensor identity information.

In an alternative mode, the generation unit 322 includes:
- a random generation unit 3221 configured to generate random identity information for the tire pressure sensor of the tire position to be reset by using a random algorithm according to the format of the tire pressure sensor identity information.

In an alternative mode, the generation unit 320 further includes:

an identity information acquisition unit 3222 configured to obtain the recorded tire pressure sensor identity information from the tire pressure monitoring system; and a first comparison and repeated removal unit 3223 configured to compare the random identity information with the recorded tire pressure sensor identity information, and if the random identity information and the recorded tire pressure sensor identity information repeat, regenerate the random identity information by using a random algorithm.

In an alternative mode, the generation unit 322 includes:

a second comparison and repeated removal unit 3224 configured to compare the random identity information with the real identity information about a tire pressure sensor of a tire position to be matched, and if the random identity information repeats with the real identity information, use a random algorithm to regenerate the random identity information.

In an alternative mode, the random generation unit 3221 includes:

a random changing subunit 32211 configured to randomly change a preset byte bit in the recorded tire pressure sensor identity information according to the format of the tire pressure sensor identity information, and generate random identity information for the tire pressure sensor of the tire position to be reset.

In an alternative mode, the generation unit 322 includes:

a null information generation unit 3225 configured to generate null identity information for the tire pressure sensor of the tire position to be reset according to the format of the tire pressure sensor identity information, wherein the null identity information is special identity information that can be recognized by the tire pressure monitoring system.

It needs to be noted that the tire pressure sensor information processing apparatus described above is based on the same concept as the tire pressure sensor information processing method according to the embodiments of the present invention, and the detailed description may refer to the description of the embodiments of the tire pressure sensor information processing method described above and will not be repeated here.

In summary, the tire pressure sensor information processing apparatus provided by the embodiments of the present invention can effectively avoid the repetition of the real identity information about the tire pressure sensor written in the matching learning process and the original identity information already stored in the tire pressure monitoring system by determining the tire position to be reset where the tire pressure sensor identity information clearing operation needs to be performed, updating the original identity information about the tire pressure sensor at the tire position to false identity information in the tire pressure monitoring system, and then writing the real identity information about the tire pressure sensor at the tire position to be matched into the tire pressure monitoring system, thus greatly improving the success rate of the tire pressure sensor matching and improving user experience.

Figure 4:
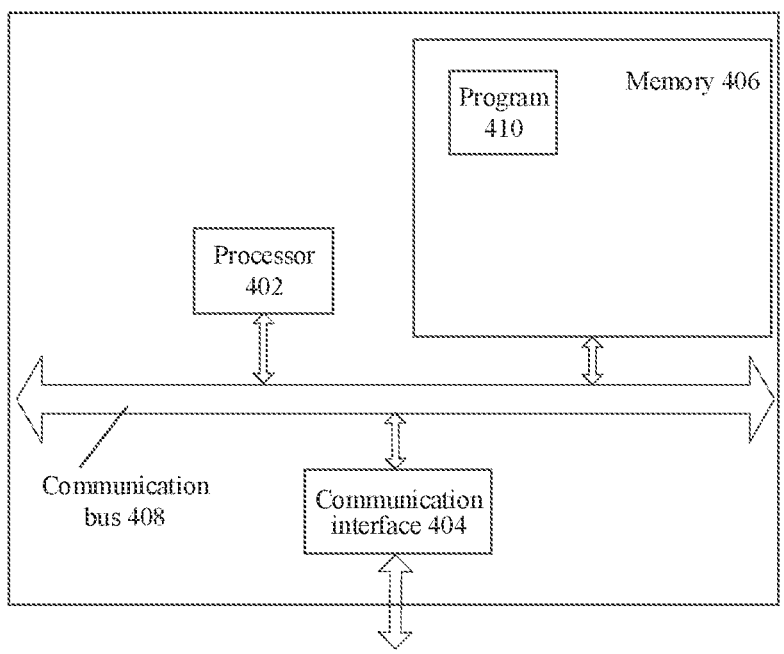
FIG. 4 shows a schematic structural diagram of a tire pressure sensor information processing device provided by an embodiment of the present invention.

FIG. 4 shows a schematic structural diagram of a tire pressure sensor information processing device provided by an embodiment of the present invention. The device may in particular be the diagnostic device as in the embodiments described above. A specific embodiment of the present invention does not limit the specific implementation of the tire pressure sensor information processing device.

As shown in FIG. 4, the tire pressure sensor information processing device may include: a processor 402, a communications interface 404, a memory 406, and a communication bus 408.

The processor 402, the communication interface 404, and the memory 406 complete mutual communication through the communication bus 408. The communication interface 404 is used for communicating with a network element of other devices, such as a client, or other servers. The processor 402 is used to execute a program 410. It can specifically execute the relevant steps in the embodiments of the tire pressure sensor information processing method mentioned above.

In particular, the program 410 may include a program code comprising a computer-executable instruction.

The processor 402 may be a central processing unit CPU, or an application-specific integrated circuit ASIC, or one or more integrated circuits configured to implement an embodiment of the present invention. The tire pressure sensor information processing device comprises one or more processors, which may be the same type of processor, such as one or more CPUs; or may also be processors of different types, such as one or more CPUs and one or more ASICs.

The memory 406 is used for storing a program 410. The memory 406 may include a high-speed RAM memory, or may also include non-volatile memory, such as at least one disk memory.

The program 410 may be specifically called by the processor 402 to cause the tire pressure sensor information processing device to execute the following operations:

determining tire position to be reset, tire position to be reset being tire position having corresponding tire pressure sensor identity information in tire pressure monitoring system that needs to be cleared;

generating false identity information for the tire pressure sensor of tire position to be reset;

after the tire pressure monitoring system enables learning mode, sending false identity information to the tire pressure monitoring system, so as to cause the tire pressure monitoring system to update the identity information of the tire pressure sensor of tire position to be reset to false identity information;

obtaining real identity information of tire pressure sensor of tire position to be matched, tire position to be matched comprising tire position to be reset; and sending real identity information to the tire pressure monitoring system, so as to cause the tire pressure monitoring system to update the identity information of the tire pressure sensor of tire position to be matched to real identity information.

In an alternative mode, before determining the tire position to be reset, the following is included:

sending tire pressure sensor identity information for a first tire position to the tire pressure monitoring system; and receiving a prompt message sent by the tire pressure monitoring system that repeated identity information exists.

In an alternative mode, the prompt message includes prompt information that the tire pressure sensor identity information for the first tire position repeats with the tire pressure sensor identity information for the second tire position that has been recorded in the tire pressure monitoring system.

Determining a tire position to be reset includes: determining the second tire position as the tire position to be reset according to the prompt information.

In an alternative mode, determining the tire position to be reset includes:
  according to the prompt message, obtaining, from a tire pressure monitoring system, information that the tire pressure sensor identity information about the first tire position and tire pressure sensor identity information about the second tire position that has been recorded in the tire pressure monitoring system repeat; and determining the second tire position as the tire position to be reset.

In an alternative mode, determining the tire position to be reset includes:
  obtaining all tire positions recorded with tire pressure sensor identity information from the tire pressure monitoring system; and determining the tire position as a tire position to be reset.

In an alternative mode, determining the tire position to be reset includes:
  obtaining all tire positions monitored by the tire pressure monitoring system according to vehicle models; and determining the tire positions as the tire position to be reset.

In an alternative mode, generating false identity information for the tire pressure sensor of tire position to be reset includes:
  determining the format of the tire pressure sensor identity information;
  and generating the false identity information for the tire pressure sensor of the tire position to be reset according to the format of the tire pressure sensor identity information.

In an alternative mode, generating the false identity information for the tire pressure sensor of the tire position to be reset according to the format of the tire pressure sensor identity information includes:
  generating random identity information for the tire pressure sensor of the tire position to be reset by using a random algorithm according to the format of the tire pressure sensor identity information.

In an alternative mode, generating the false identity information for the tire pressure sensor of the tire position to be reset according to the format of the tire pressure sensor identity information includes:
  generating null identity information for the tire pressure sensor of the tire position to be reset according to the format of the tire pressure sensor identity information, wherein the null identity information is special identity information that can be recognized by the tire pressure monitoring system.

The above-mentioned tire pressure sensor information processing device can execute the tire pressure sensor information processing method provided in the embodiments of the present invention, and has corresponding functional modules and beneficial effects. For technical details not fully described in this embodiment, please refer to the above embodiments of the tire pressure sensor information processing method.

In summary, the tire pressure sensor information processing device provided by the embodiments of the present invention can effectively avoid the repetition of the real identity information about the tire pressure sensor written in the matching learning process and the original identity information already stored in the tire pressure monitoring system by determining the tire position to be reset where the tire pressure sensor identity information clearing operation needs to be performed, updating the original identity information about the tire pressure sensor at the tire position to false identity information in the tire pressure monitoring system, and then writing the real identity information about the tire pressure sensor at the tire position to be matched into the tire pressure monitoring system, thus greatly improving the success rate of the tire pressure sensor matching and improving user experience.

An embodiment of the present invention provides a computer-readable storage medium that stores at least one executable instruction that, when run on a tire pressure sensor information processing device, causes the tire pressure sensor information processing device to execute the tire pressure sensor information processing method in any of the aforementioned method embodiments. For technical details not fully described in this embodiment, please refer to the above embodiments of the tire pressure sensor information processing method provided by the present invention.

In the description provided herein, numerous specific details are set forth. However, it could be understood that embodiments of the invention may be practiced without these specific details. In some instances, well-known methods, structures, and techniques have not been shown in detail in order not to obscure the understanding of this description.

Similarly, it should be understood that in the above description of example embodiments of the invention, various features of the embodiments of the invention are sometimes grouped together in a single embodiment, figure, or the description thereof for the purpose of streamlining the invention and aiding in the understanding of one or more of the various inventive aspects. However, the disclosed method should not be interpreted as reflecting the intention that the claimed invention requires more features than those clearly recorded in each claim.

It could be understood by those skilled in the art that the modules in the devices in the embodiments may be changed adaptively and arranged in one or more devices different from the embodiment. Modules or units or assemblies in an embodiment may be combined into one module or unit or assembly and may be divided into a plurality of sub-modules or sub-units or sub-assemblies. Except that at least some of such features and/or processes or units are mutually exclusive, all features disclosed in the description (including accompanying claims, abstract, and drawings) and all processes or units of any method or device so disclosed can be combined in any combination. Each feature disclosed in the description (including any accompanying claims, abstract, and drawings) may be replaced by alternative features serving the same, equivalent, or similar purpose, unless expressly stated otherwise.

It should be noted that the above-mentioned embodiments illustrate rather than limit the invention, and that those skilled in the art can design alternative embodiments without departing from the scope of the appended claims. In the claims, any reference sign placed in a bracket shall not be construed as limiting the claims. The word "comprising" does not exclude the presence of an element or a step other than those listed in a claim. The word "a" or "one" preceding an element does not exclude the presence of a plurality of such elements. The present invention can be implemented by means of hardware comprising several distinct elements, and by means of a suitably programmed computer. In a unit claim enumerating several devices, several devices of these devices can be specifically embodied by one and the same item of hardware. The use of the words first, second, third, etc. does not denote any order. These words may be interpreted as names. The steps in the above embodiments are not to be construed as limiting the order of execution unless otherwise specified.

The invention claimed is:

1. A tire pressure sensor information processing method, wherein the method comprises:
   determining tire position to be reset, the tire position to be reset being tire position having corresponding tire pressure sensor identity information in tire pressure monitoring system that needs to be cleared;
   generating false identity information for tire pressure sensor of the tire position to be reset;
   after the tire pressure monitoring system enables learning mode, sending the false identity information to the tire pressure monitoring system, so as to cause the tire pressure monitoring system to update identity information of tire pressure sensor of the tire position to be reset to the false identity information;
   obtaining real identity information of the tire pressure sensor of a tire position to be matched, the tire position to be matched comprising the tire position to be reset; and
   sending the real identity information to the tire pressure monitoring system, so as to cause the tire pressure monitoring system to update the identity information of the tire pressure sensor of the tire position to be matched to the real identity information.

2. The method according to claim 1, wherein before determining tire position to be reset, the method further comprises:
   sending tire pressure sensor identity information for a first tire position to the tire pressure monitoring system; and
   receiving a prompt message sent by the tire pressure monitoring system that repeated identity information exists.

3. The method according to claim 2, wherein the prompt message comprises prompt information that the tire pressure sensor identity information for the first tire position repeats with the tire pressure sensor identity information for a second tire position that has been recorded in the tire pressure monitoring system;
   the determining tire position to be reset comprises:
   determining the second tire position as the tire position to be reset according to the prompt information.

4. The method according to claim 2, wherein the determining tire position to be reset comprises:
   according to the prompt message, obtaining, from the tire pressure monitoring system, information that the tire pressure sensor identity information about the first tire position and the tire pressure sensor identity information about a second tire position that has been recorded in the tire pressure monitoring system repeat; and determining the second tire position as the tire position to be reset.

5. The method according to claim 1, wherein the determining tire position to be reset comprises:
   obtaining all tire positions recorded with tire pressure sensor identity information from the tire pressure monitoring system; and determining the tire positions as the tire positions to be reset.

6. The method according to claim 1, wherein the determining tire position to be reset comprises:
   obtaining all tire positions monitored by the tire pressure monitoring system according to vehicle models; and determining the tire positions as the tire positions to be reset.

7. The method according to claim 1, wherein the generating false identity information for tire pressure sensor of the tire position to be reset comprises:
   determining a format of the tire pressure sensor identity information; and
   generating the false identity information for tire pressure sensor of the tire position to be reset according to the format of the tire pressure sensor identity information.

8. The method according to claim 7, wherein the generating the false identity information for tire pressure sensor of the tire position to be reset according to the format of the tire pressure sensor identity information comprises:
   generating random identity information for the tire pressure sensor of the tire position to be reset by using a random algorithm according to the format of the tire pressure sensor identity information.

9. The method according to claim 7, wherein the generating the false identity information for tire pressure sensor of the tire position to be reset according to the format of the tire pressure sensor identity information comprises:
   generating null identity information for the tire pressure sensor of the tire position to be reset according to the format of the tire pressure sensor identity information, wherein the null identity information is special identity information that can be recognized by the tire pressure monitoring system.

10. A tire pressure sensor information processing device, comprising: a processor, a memory, a communication interface, and a communication bus, wherein the processor, the memory, and the communication interface complete mutual communication through the communication bus;
    the memory is configured to store at least one executable instruction that causes the processor to execute the following method:
    determining tire position to be reset, the tire position to be reset being tire position having corresponding tire pressure sensor identity information in tire pressure monitoring system that needs to be cleared;
    generating false identity information for tire pressure sensor of the tire position to be reset;
    after the tire pressure monitoring system enables learning mode, sending the false identity information to the tire pressure monitoring system, so as to cause the tire pressure monitoring system to update identity information of tire pressure sensor of the tire position to be reset to the false identity information;
    obtaining real identity information of the tire pressure sensor of a tire position to be matched, the tire position to be matched comprising the tire position to be reset; and
    sending the real identity information to the tire pressure monitoring system, so as to cause the tire pressure monitoring system to update the identity information of the tire pressure sensor of the tire position to be matched to the real identity information.

11. The tire pressure sensor information processing device according to claim 10, wherein before determining tire position to be reset, the processor comprises:
    sending tire pressure sensor identity information for a first tire position to the tire pressure monitoring system; and
    receiving a prompt message sent by the tire pressure monitoring system that repeated identity information exists.

12. The tire pressure sensor information processing device according to claim 11, wherein the prompt message comprises prompt information that the tire pressure sensor identity information for the first tire position repeats with the tire pressure sensor identity information for a second tire position that has been recorded in the tire pressure monitoring system;
the determining tire position to be reset comprises:
determining the second tire position as the tire position to be reset according to the prompt information.

13. The tire pressure sensor information processing device according to claim 11, wherein the determining tire position to be reset comprises:
according to the prompt message, obtaining, from the tire pressure monitoring system, information that the tire pressure sensor identity information about the first tire position and the tire pressure sensor identity information about a second tire position that has been recorded in the tire pressure monitoring system repeat; and determining the second tire position as the tire position to be reset.

14. The tire pressure sensor information processing device according to claim 10, wherein the determining tire position to be reset comprises:
obtaining all tire positions recorded with tire pressure sensor identity information from the tire pressure monitoring system; and determining the tire positions as the tire positions to be reset.

15. The tire pressure sensor information processing device according to claim 10, wherein the determining tire position to be reset comprises:
obtaining all tire positions monitored by the tire pressure monitoring system according to vehicle models; and determining the tire positions as the tire positions to be reset.

16. The tire pressure sensor information processing device according to claim 10, wherein the generating false identity information for tire pressure sensor of the tire position to be reset comprises:
determining a format of the tire pressure sensor identity information; and
generating the false identity information for tire pressure sensor of the tire position to be reset according to the format of the tire pressure sensor identity information.

17. The tire pressure sensor information processing device according to claim 16, wherein the generating the false identity information for tire pressure sensor of the tire position to be reset according to the format of the tire pressure sensor identity information comprises:

generating random identity information for the tire pressure sensor of the tire position to be reset by using a random algorithm according to the format of the tire pressure sensor identity information.

18. The tire pressure sensor information processing device according to claim 16, wherein the generating the false identity information for tire pressure sensor of the tire position to be reset according to the format of the tire pressure sensor identity information comprises:
generating null identity information for the tire pressure sensor of the tire position to be reset according to the format of the tire pressure sensor identity information, wherein the null identity information is special identity information that can be recognized by the tire pressure monitoring system.

19. A non-transitory computer-readable storage medium, wherein at least one executable instruction is stored in the storage medium, and when executed by a processor, causes the processor to perform the following method: determining tire position to be reset, the tire position to be reset being tire position having corresponding tire pressure sensor identity information in tire pressure monitoring system that needs to be cleared; generating false identity information for tire pressure sensor of the tire position to be reset; after the tire pressure monitoring system enables learning mode, sending the false identity information to the tire pressure monitoring system, so as to cause the tire pressure monitoring system to update identity information of tire pressure sensor of the tire position to be reset to the false identity information; obtaining real identity information of the tire pressure sensor of a tire position to be matched, the tire position to be matched comprising the tire position to be reset; and sending the real identity information to the tire pressure monitoring system, so as to cause the tire pressure monitoring system to update the identity information of the tire pressure sensor of the tire position to be matched to the real identity information.

20. The non-transitory computer-readable storage medium according to claim 19, wherein before determining tire position to be reset, the processor comprises: sending tire pressure sensor identity information for a first tire position to the tire pressure monitoring system; and receiving a prompt message sent by the tire pressure monitoring system that repeated identity information exists.

* * * * *